US010598293B2

(12) United States Patent
Pearson et al.

(10) Patent No.: US 10,598,293 B2
(45) Date of Patent: Mar. 24, 2020

(54) TEMPERATURE ACTUATED ELECTROMECHANICAL PRESSURE RELIEF VALVE

(71) Applicants: James E. Pearson, Downers Grove, IL (US); Stefan John Szewczyk, Lansing, IL (US); Gary Richard Millikan, Holland, MI (US)

(72) Inventors: James E. Pearson, Downers Grove, IL (US); Stefan John Szewczyk, Lansing, IL (US); Gary Richard Millikan, Holland, MI (US)

(73) Assignee: Robertshaw Controls Company, Itasca, IL (US)

( * ) Notice: Subject to any disclaimer, the term of this patent is extended or adjusted under 35 U.S.C. 154(b) by 334 days.

(21) Appl. No.: 15/296,913

(22) Filed: Oct. 18, 2016

(65) Prior Publication Data

US 2017/0114913 A1    Apr. 27, 2017

Related U.S. Application Data

(60) Provisional application No. 62/246,876, filed on Oct. 27, 2015.

(51) Int. Cl.
*F16K 17/10*    (2006.01)
*F16K 31/00*    (2006.01)
(Continued)

(52) U.S. Cl.
CPC ............ *F16K 17/10* (2013.01); *E03B 7/071* (2013.01); *E03B 7/075* (2013.01); *E03B 7/12* (2013.01);
(Continued)

(58) Field of Classification Search
CPC ............ E03B 7/10; E03B 7/12; F16K 31/002; G05D 23/02; G05D 23/08; G05D 23/10;
(Continued)

(56) References Cited

U.S. PATENT DOCUMENTS 3,380,464 A    4/1968  Arterbury et al.
3,428,251 A    2/1969  Gross et al.
(Continued)

OTHER PUBLICATIONS

Water Hammer and How It Can Damage Pipes and Plumbing Systems. (Mar. 8, 2013). Retrieved Dec. 22, 2018, from http://www.balkanplumbing.com/water-hammer-damage-pipes-plumbing-system/.*

(Continued)

*Primary Examiner* — Jonathan Bradford
(74) *Attorney, Agent, or Firm* — Reinhart Boerner Van Deuren P.C.

(57) ABSTRACT

Presented are embodiments of pressure relief valves for use in water supply systems to prevent damage thereto caused by over pressure resulting from freezing of the water therein. In one embodiment the pressure relief valve is included in an electromechanical solenoid controlled water valve particularly useful in appliances such as washing machines, water heaters, refrigerators, etc. Prior to the main valving member, a spring loaded pressure relief valving member is included. Once the pressure within the valve exceeds the spring force, which is set below the failure pressure of the water supply system and the valve, the pressure relief valving member opens to allow a flow of water therethrough. Alternatively or additionally, a temperature active device such as a bi-metal disc is interposed between the spring and the pressure relief valving member to provide actuation thereof below a predetermined temperature.

16 Claims, 3 Drawing Sheets

(51) Int. Cl.
*F16K 31/40* (2006.01)
*E03B 7/07* (2006.01)
*F16K 15/02* (2006.01)
*E03B 7/12* (2006.01)
*F16K 1/12* (2006.01)
*F16K 17/00* (2006.01)
*F16K 31/06* (2006.01)

(52) U.S. Cl.
CPC .............. *F16K 1/12* (2013.01); *F16K 15/026* (2013.01); *F16K 17/003* (2013.01); *F16K 31/002* (2013.01); *F16K 31/0655* (2013.01); *F16K 31/404* (2013.01)

(58) Field of Classification Search
CPC .... G05D 23/12; G05D 23/121; G05D 23/123; G05D 23/1852; G05D 23/1854; G05D 23/1856
See application file for complete search history.

(56) References Cited

U.S. PATENT DOCUMENTS

| | | | |
|---|---|---|---|
| 4,025,042 A | 5/1977 | Doherty, Jr. et al. | |
| 4,180,236 A * | 12/1979 | Saarem | F16K 31/402 251/30.02 |
| 4,327,761 A | 5/1982 | Shelton | |
| 4,657,038 A | 4/1987 | Lyons | |
| 4,809,727 A | 3/1989 | Chamberlin | |
| 4,865,249 A * | 9/1989 | Sugano | F01P 11/18 123/41.15 |
| 4,878,512 A | 11/1989 | Pirkel | |
| 5,623,962 A * | 4/1997 | Danzy | F16K 17/04 137/469 |
| 5,715,855 A | 2/1998 | Bennett | |
| 5,947,150 A | 9/1999 | Ryan | |
| 6,626,202 B1 * | 9/2003 | Harvey | E03B 7/12 137/62 |
| 6,886,580 B2 | 5/2005 | Jobe et al. | |
| 7,594,516 B2 | 9/2009 | Maisch et al. | |
| 8,074,673 B2 | 12/2011 | Maisch et al. | |
| 8,689,813 B2 | 4/2014 | Kim et al. | |
| 2012/0097253 A1 | 4/2012 | Eutsler | |
| 2013/0025709 A1 | 1/2013 | Mann et al. | |
| 2014/0158210 A1 | 6/2014 | Kim | |

OTHER PUBLICATIONS

Preventing Water Hammer from Damaging Pumps and Pipes. (Oct. 10, 2011). Retrieved Dec. 22, 2018, from http://empoweringpumps.com/preventing-water-hammer-from-damaging-pumps-and-pipes/.*

* cited by examiner

TEMPERATURE ACTUATED ELECTROMECHANICAL PRESSURE RELIEF VALVE

CROSS-REFERENCE TO RELATED PATENT APPLICATION

This patent application claims the benefit of U.S. Provisional Patent Application No. 62/246,876, filed Oct. 27, 2015, the entire teachings and disclosure of which are incorporated herein by reference thereto.

FIELD OF THE INVENTION

This invention generally relates to pressure relief valves, and more particularly to electromechanical pressure relief valves for consumer appliances.

BACKGROUND OF THE INVENTION

Poorly or incorrectly insulated homes can subject internal water supply systems to freezing. Such freezing, due to the expansion created by the freezing of water, can induce an over-pressure condition in the internal water supply system. This over-pressure condition often leads to structural failure of components within the water supply system, leading to expensive water damage within the residence.

Embodiments of the present invention provide electromechanical pressure relief valves for consumer appliances to reduce the incidence of product failures due to exposure of residential water supply lines to freezing conditions. These and other advantages of the invention, as well as additional inventive features, will be apparent from the description of the invention provided herein.

BRIEF SUMMARY OF THE INVENTION

The embodiments of the electromechanical pressure relief valve of the present invention function to initiate water flow in the event that device temperatures fall at or below a defined threshold and/or that internal system pressure exceeds a predefined threshold. This water flow reduces and/or prevents the build-up of undesirable pressure in the water delivery system, thus reducing and/or eliminating structural failure of components within the water supply system and the well documented property loss and damage resulting therefrom. Embodiments of the present invention can either be a stand-alone device or an integrated part of an assembly, such as a consumer appliance, providing additional functions.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
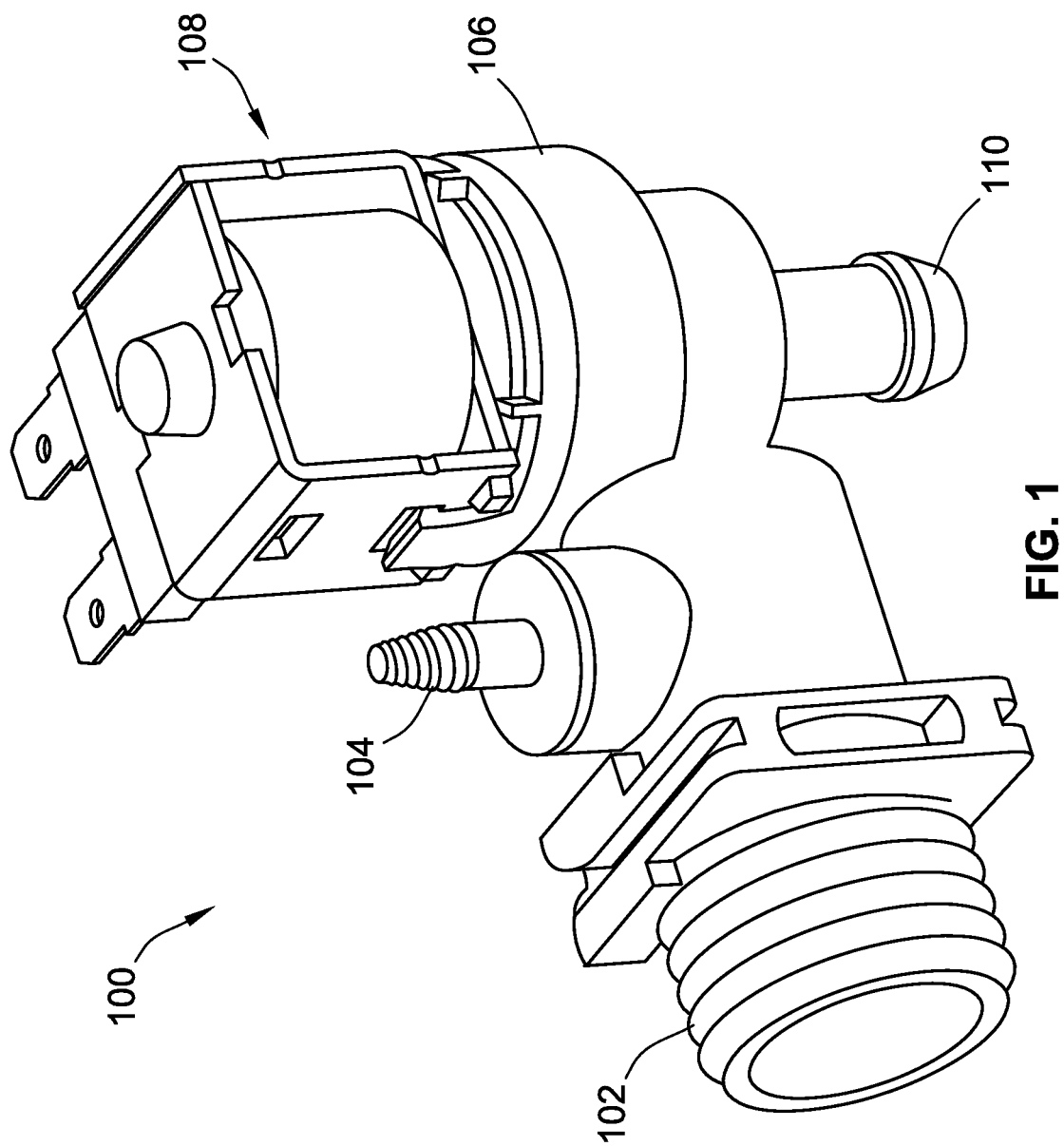
FIG. 1 is an isometric illustration of an embodiment of the electromechanical pressure relief valve of the present invention.

Turning now to the drawings, and in particular to FIG. 1, there is illustrated an embodiment of the electromechanical pressure relief valve 100 of the present invention. Such an embodiment is particularly useful in controlling water flow to consumer and commercial appliances, such as dishwashers, refrigerators, washing machines, etc. as a standalone component of the water supply system or as a component of the appliances themselves. While this embodiment finds particular use in such environments, those skilled in the art will recognize from the following that such uses and construction are not limiting, but are provided herein by way of example.

Preferably, an embodiment of the valve 100 of the present invention is connected directly to a water supply system of a residence via a standard threaded connector 102 downstream of any backflow preventers (not shown) but prior to the installed appliances (not shown). In the illustrated embodiment, a pressure relief coupling 104 is provided after the connector 102 but upstream of the valve housing 106. In the illustrated embodiment, the valve 100 utilizes a solenoid 108 to control the flow of water through the valve 100 as will be recognized by those skilled in the art. This main flow of water is provided to the appliance via a main water flow coupling 110, as is also standard.

In order to prevent damage to the water supply system, e.g. a burst pipe, the valve 100 is designed to initiate a small flow of water in the event of exposure to low ambient temperature and/or high water supply pressure. As mentioned above, this high water supply pressure is caused by expansion during freezing of the water. The small flow of water is provided through the pressure relief coupling 104 and may be disposed through the normal waste/drain system of the residence. This small flow of water through coupling 104 is sized based on the capacity of the water supply system to be sufficient in volume to prevent the full freezing of the water delivery system. In this way the valve 100 is able to reduce or prevent the build-up of undesirable pressure in the water delivery system, thus reducing or eliminating structural failure of components within the water supply system.

Figure 2:
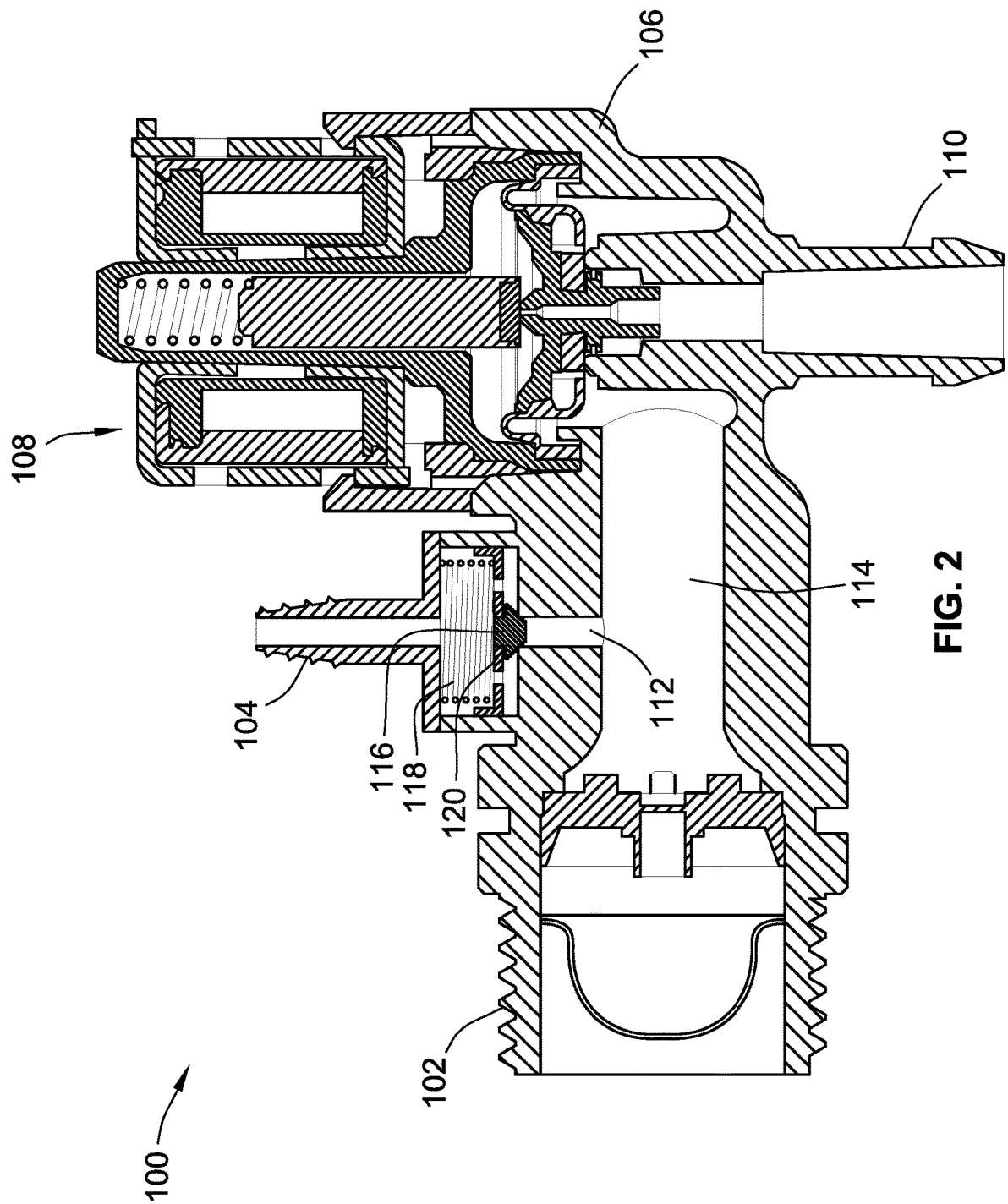
FIG. 2 is a cross-sectional illustration of the embodiment of the electromechanical pressure relief valve of FIG. 1.

As shown in the cross-section of FIG. 2, the valve 100 is equipped with a relief port 112 that is fluidly coupled to the main water flow channel 114 in the valve 100. The flow of water through the relief port 112 is regulated by a valving member 116 that is held in place by spring 118. The spring force of spring 118 is designed to hold valving member 116 in place under normal operating pressures, but to allow the valving member 116 to open at a defined pressure level below the failure pressure of the components of the water supply system. This pressure relief operation operates independently of the low temperature function of valve 100 to prevent damage to the water supply system in installations where the valve 100 may be installed in a warmer ambient environment, but fed from a portion of the water supply system that is exposed to colder ambient conditions resulting in water freezing therein.

Figure 3:
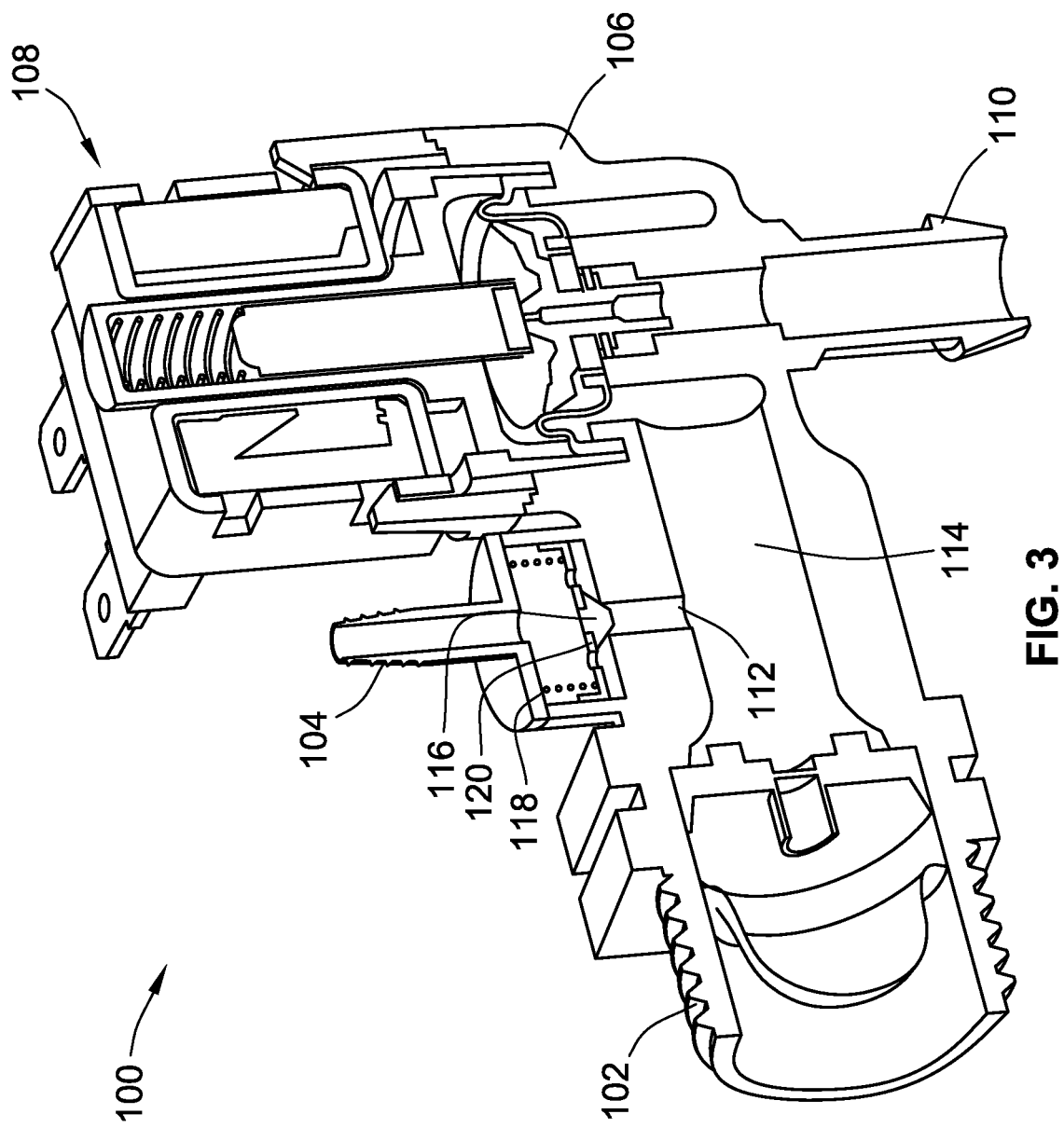
FIG. 3 is a cross-sectional isometric illustration of the embodiment of the electromechanical pressure relief valve of FIG. 1.

As mentioned above, certain embodiments of the valve 100 may also function to initiate water flow through coupling 104 under defined temperature excursions. In such embodiments, the valving member 116 is unseated by actuation/deflection of a bi-metal disc 120, as may best be seen in FIG. 3, or other known temperature sensitive actuation devices, to open the relief port 112 and begin the flow of water to the drainage system. The bi-metal disc 120 will reset itself once the freezing condition is no longer present so as to close the relief port 112 via valving member 116.

In embodiments of the valve 100 of the present invention that are provided as part of the appliance itself, the valve 100 is provided as the first component to which the water supply line is coupled. In such embodiments, the water flow through coupling 104 may be directed into the appliance wherein the appliance control system can detect the presence of the water. In certain embodiments, the appliance may turn on a pump to drain the water into the normal waste/drain system. The appliance may then provide an indication of the operation of valve 100 and the potential freezing conditions in the water supply system to alert the consumer to the problem.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. As an example, the pressure relief valve may be provided in a section of pipe of the water supply system disassociated from any main flow control valve to prevent bursting of said pipe under high pressure and/or freezing conditions. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pressure relief valve, comprising:
   a valve housing having an inlet, an outlet, and a main water flow channel defined therebetween, the housing further defining a relief port that is fluidly coupled to the main water flow channel;
   a valving member operably engaging the relief port; and
   a spring having a spring force selected to be lower than a failure pressure of the valve housing, the spring being operably coupled to the valving member to hold the valving member in sealing contact with the relief port when a pressure within the valve housing is below the spring force and to release the valving member from sealing contact when the pressure within the valve housing is above the spring force; and
   wherein release of the valving member from the sealing contact allows a flow of water from the main flow channel to exit the valve housing through a water flow through coupling fluidly connected to the relief port; and a solenoid controlled valve interposed between the inlet and the outlet, downstream of the relief port, to control a main flow of water through the main water flow channel from the inlet to the outlet;
   wherein the valving member includes a bi-metal disc through which the spring force is applied, and wherein deflection of the bi-metal disc unseats the valving member from the relief port to allow the flow of water from the main water flow channel through the relief port when a temperature of the bi-metal disc is below a predetermined temperature.

2. The pressure relief valve of claim 1, wherein the relief port defined by the valve housing is circular.

3. The pressure relief valve of claim 1, wherein the water flow through coupling fluidly connected to the relief port defines an exit flow path out of the valve housing.

4. The pressure relief valve of claim of 2, wherein a circular flange of the water flow through coupling sealingly engages an outer periphery of the relief port of the valve housing to fluidly connect the water flow through coupling to the relief port of the valve housing.

5. The pressure relief valve of claim of 3, wherein a water flow coupling defines the water flow coupling channel that extends from the valve housing transverse to the main water flow and approximately parallel to a relief flow channel defined by the relief port.

6. The pressure relief valve of claim 5, wherein the relief flow channel and the water flow channel extend in opposite directions radially away from the valve housing.

7. The pressure relief valve of claim 1, wherein a solenoid of the solenoid controlled valve and the water flow through coupling are located on a same side of the valve housing.

8. The pressure relief valve of claim 1, wherein an outermost peripheral surface at the inlet of the valve housing is threaded.

9. A pressure relief valve, comprising:
   a valve housing having an inlet, an outlet, and a main water flow channel defined therebetween, the housing further defining a relief port that is fluidly coupled to the main water flow channel;
   a valving member operably engaging the relief port; and
   wherein a temperature sensitive actuation device of the valving member comprises a bimetallic plate and spring, the bimetallic plate and spring operable to unseat the valving member to allow a flow of water to exit the relief port out of the valve housing;

wherein a spring force of the spring is applied through the bi-metal plate to seat the valving member, and wherein deflection of the bi-metal plate unseats the valving member from the relief port to allow the flow of water from the main water flow channel through the relief port when a temperature of the bi-metal plate is below a predetermined temperature.

10. The pressure relief valve of claim 9, wherein the spring force is selected to be lower than a failure pressure of the valve housing, the spring being operably coupled to the valving member to hold the valving member in sealing contact with the relief port when a pressure within the valve housing is below the spring force.

11. The pressure relief valve of claim 9, wherein the bimetallic plate has a first state and a second state; and wherein in the first state the spring biases the bimetallic plate in a first direction to sealingly engage the relief port and wherein in the second state the bimetallic plate biases the spring in a second direction, opposite the first direction, to unseat the bimetallic plate from the relief port to allow a flow of water from the main water flow channel through the relief port.

12. The pressure relief valve of claim 9, wherein a flow path of the relief port extends transverse to the main flow path.

13. The pressure relief valve of claim 9, wherein the relief port is in fluid connection with a water flow through coupling.

14. The pressure relief valve of claim 13, wherein the water flow through coupling is in fluid communication with an appliance for sensing a flow through the relief port and out of the valve housing.

15. The pressure relief valve of claim 14, wherein water flow through coupling is conical and comprises external threads.

16. The pressure relief valve of claim 9, wherein the relief port is downstream of the inlet port and upstream of a solenoid controlled valve, the solenoid controlled valve controlling the main flow of water through the main water flow channel from the inlet to the outlet.

* * * * *